United States Patent
Hamilton et al.

(10) Patent No.: US 6,730,734 B1
(45) Date of Patent: May 4, 2004

(54) IMPACT MODIFIER COMPOSITIONS WHICH ENHANCE THE IMPACT STRENGTH PROPERTIES AND LOWER THE VISCOSITY OF MELT PROCESSED PLASTICS RESINS AND METHODS OF MAKING SAID COMPOSITIONS

(75) Inventors: Raymond Gerard Hamilton, Washington Crossing, PA (US); Carlos Alfonso Cruz, Holland, PA (US); Chuen-Shyong Chou, Ambler, PA (US); Susan Marie Liwak, Langhorne, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/455,650

(22) Filed: Dec. 7, 1999

Related U.S. Application Data

(60) Provisional application No. 60/111,361, filed on Dec. 8, 1998.

(51) Int. Cl.$^7$ .......................... C08L 33/00; C08L 33/06; C08L 39/00
(52) U.S. Cl. ...................... 524/523; 524/555; 524/560; 524/562
(58) Field of Search ............................... 524/560, 562, 524/523, 555

(56) References Cited

U.S. PATENT DOCUMENTS

| | | | |
|---|---|---|---|
| 2,802,809 A | 8/1957 | Hayes | 260/45.5 |
| 2,943,074 A | 6/1960 | Feuer | 260/45.5 |
| 3,251,904 A | 5/1966 | Souder et al. | 260/876 |
| 3,403,120 A | 9/1968 | Ott et al. | 260/33.6 |
| 3,428,707 A | 2/1969 | Amos et al. | 260/827 |
| 3,671,610 A | 6/1972 | Amagi et al. | 260/880 |
| 3,678,133 A | 7/1972 | Ryan | 260/876 |
| 3,725,507 A | 4/1973 | Nakano et al. | 260/896 |
| 3,793,402 A | 2/1974 | Owens | 260/876 |
| 3,899,547 A | 8/1975 | Amagi et al. | 260/876 |
| 3,940,456 A | 2/1976 | Frey et al. | 260/897 |
| 4,379,876 A | 4/1983 | Clikeman et al. | |
| 4,456,733 A | 6/1984 | Hornbaker | |
| 4,918,118 A | 4/1990 | Kawakatsu et al. | 523/334 |
| 5,049,590 A | 9/1991 | Botsolas et al. | 521/51 |
| 5,360,853 A | 11/1994 | Nagata et al. | 524/269 |
| 5,717,021 A | 2/1998 | Huang et al. | 524/484 |
| 5,780,549 A | 7/1998 | Ludwig | 525/84 |
| 5,834,563 A | 11/1998 | Kimura et al. | 525/319 |
| 5,990,244 A | * 11/1999 | Warakomski et al. | 525/179 |
| 6,011,116 A | 1/2000 | Aoyama et al. | 525/86 |

FOREIGN PATENT DOCUMENTS

| | | |
|---|---|---|
| CA | 2102478 | 5/1993 |
| EP | 177096 | 4/1986 |
| EP | 488984 A2 | 6/1992 |
| EP | 0568922 A1 | 11/1993 |
| GB | 1294311 | 10/1972 |
| JP | 49-28634 | 3/1974 |

OTHER PUBLICATIONS

Australian Patent Office Search Report for Singapore Patent Application SG 9905982–6, Jun. 29, 2000.
Derwent Abstract Accession No. 80–42245C, JP 55–058241 A, Apr. 30, 1980.
Derwent Abstract Accession No. 92–129594, JP 4–076041, Mar. 10, 1992.
Vitands, E., *Acrylonitrile–Butadiene–Styrene Modification with Polybutene*, Society of Plastics Engineers, ANTEC 1996.
Enlow, W. P., et al. *Enhance Properties of Impact Modified PVC with Polybutene*, Society of Plastics Engineers, ANTEC 1997.
Deanin, R.D. et al., *Solid plasticizers in rigid poly(vinyl chloride).*, Soc. Plast. Eng., Tech. Pap. (1974), 20 509–11.
Deanin, R.D. et al., *Solid plasticizers in rigid poly(vinyl chloride). II. PVC molecular weight and plasticizer type and concentration.* Soc. Plast. Eng., Tech. Pap. (1975), 21 118–19.
Chang, E.P. et al., *The Effect of Additives on Impact PVC*, Polym. Prepr. Am. Chem. Soc. Dic. Polym. Chem. 20(1), 956–959, (1979).
R.D. Deanin et al., *Solid Plasticizer and Impact Modifier in Rigid Polyvinyl Chloride*, Polym. Material Sci. Eng. 75, 502, (1995).
D.M. Detweiler et al., *Interaction of PVC Lubricants with Other Common PVC Formulation Ingredients*, Soc. of Plas, Engin. Annual Technical Conference: Paper V 19, 647, (1973).
T.B. Zavarova et al., *Control of Proerties of Materials Based on Polyvinylchloride and a Copolymer of Methyl Methacrylate, Butadiene and Styrene Units Using Low Molecular Weight Components*, Polymer Science U.S.S.R. vol. 22, No. 10 pp 2395–2402, (1980).
Derwent Abstract Accession No. 95–085561, JP 7–011079 A, Jan. 13, 1995.
Derwent Abstract Accession No. 98–529353, Research Disclosure 413012, Sep. 10, 1998.

* cited by examiner

*Primary Examiner*—Peter D. Mulcahy
(74) *Attorney, Agent, or Firm*—Carl Hemenway

(57) ABSTRACT

The invention provides a composition which increases the impact strength and lowers the viscosity of melt processed plastics resins. In particular the invention relates to an impact modifier composition comprising at least one impact modifier and at least one mineral oil and optionally up to 50% by weight of at least one plastics resin. Methods of making such impact modifier compositions are disclosed, together with a general process for combining at least one oil with at least one impact modifier during the impact modifier manufacturing process.

21 Claims, No Drawings

IMPACT MODIFIER COMPOSITIONS WHICH ENHANCE THE IMPACT STRENGTH PROPERTIES AND LOWER THE VISCOSITY OF MELT PROCESSED PLASTICS RESINS AND METHODS OF MAKING SAID COMPOSITIONS

This is a nonprovisional application of prior pending provisional application serial No. 60/111,361 filed Dec. 8, 1998.

The present invention relates to impact modifier compositions which enhance the impact strength performance properties and also lower the viscosity of melt processed plastics resins. In particular, the impact modifier compositions of the present invention improve the impact and viscosity properties of polyvinyl halide resin compounds such as polyvinyl chloride. The invention also provides methods of making these impact modifier compositions.

Plastics resins are used in numerous applications, for example, in plastics sheet, and in blow and extrusion moulded articles such as bottles and containers and building materials. However, articles moulded from resins often suffer from performance problems due to their rigid nature which causes the moulded articles to break or crack easily. To counteract these difficulties it is well known to mix the plastics resins with additive materials, for example, impact strength modifiers to improve the impact strength properties of the moulded articles.

Another important property which markedly influences the efficiency of moulding plastics resins is the viscosity of the resin at the moulding or processing temperature (hereafter 'melt viscosity'). To ensure that the extrusion and blow moulding pressures are low so as to maximise the efficiency of the extrusion/moulding equipment, it is highly advantageous for the melt viscosity to be kept to a minimum, whilst at the same time ensuring that the shape of the moulded article is retained and that no sagging occurs.

Although impact modifiers improve impact strength, there is a further problem in that they cause the flowability of the resin to decrease, i.e., the melt viscosity of the resin increases. This problem is noted by R. D. Deanin et al in Polym. Material Sci. Eng. 75, 502, 1995. This journal article teaches that the viscosity problem can be overcome by the addition of small amounts, about 5 parts per hundred parts of resin, of solid plasticizers such as dicyclohexyl phthalate. However, although such plasticizers do reduce resin melt viscosity, they do so at the expense of increasing embrittlement or decreasing the impact strength of plastics resins.

There are also several patents which disclose the enhancement of impact strength performance of plastics resins using conventional impact modifiers in combination with various other additives. For example, U.S. Pat. No. 5,780,549 discloses that the impact resistance of PVC compounds is improved by first forming a modified impact modifier by allowing polybutene polymer to absorb into a conventional impact modifier and then adding this modified impact modifier to PVC and processing in the usual manner. U.S. Pat. No. 5,360,853 discloses blending together PVC, an impact modifier and polysiloxane to obtain a PVC resin with enhanced impact strength resistance as compared to PVC resin with the impact modifier alone. Similarly, U.S. Pat. No. 3,428,707 teaches increasing the impact strength of a PVC/impact modifier composition by preparing a blend of PVC and an impact modifier and then milling this blend with polysiloxane. Although these prior art documents disclose that impact strength is improved by the addition of polybutene and polysiloxane, these materials are expensive and this reduces the cost effectiveness of the plastics resin.

Canadian Patent Application No. 2,102,478 discloses that the impact strength of polyvinyl chloride resin may be improved by mixing it with an impact modifier and a lubricant system; the latter comprises a long chain carboxylic acid, a metal salt of a carboxylic acid and mineral oil. However, either the process used to combine the PVC and the other components in the reaction system together, or the choice of reaction components, or both, does not appear to give either a consistently large decrease in the viscosity or a consistently large increase in the impact strength of the melt processed PVC.

A journal article published by D. M. Detweiler et al in Society of Plastics Engineers Annual Technical Conference: Paper V 19, 647, (1973), discloses a study of the interaction of impact modifiers and lubricants. The experiments were conducted by mixing together a polyvinyl chloride resin, an impact modifier, a stabiliser and a lubricant. The results show that the addition of the lubricants can improve the performance of the MBS impact modifier but they apparently have very little effect on the melt viscosity of the PVC resin.

Finally, an article published in Polymer Science U.S.S.R. Vol. 22, No. 10 pp 2395–2402, 1980 by T. B. Zavarova et al teaches that the impact strength of a PVC plastic resin containing a methyl methacrylate/butadiene/styrene (MBS) impact modifier can be increased by the addition of a lubricant such as butyl stearate, glycerin monoricinoleate, transformer oil or α-hydroxyisobutyric acid. However, this prior art teaches, in particular, that the presence of the butyl stearate has no effect on the melt viscosity of PVC-MBS compositions.

The aim of the present invention, therefore, is to provide an impact modifier composition which enhances the impact strength properties of melt processed plastics resins and which also has a lowering effect on the melt viscosity of such plastics resins.

Accordingly, in a first embodiment, the present invention provides an impact modifier composition comprising at least one impact modifier and at least one mineral oil, and further comprising 0–50% by weight of the composition of one or more plastics resins. Preferably the composition comprises 0–20% by weight of the composition of one or more plastics resins.

The invention also provides a method of producing the impact modifier composition described above, comprising mixing together:

a) at least one impact modifier;
 b) at least one mineral oil; and
 c) 0–50% by weight of the composition of one or more plastics resins.

The at least one impact modifier can be used (i) in latex or emulsion form, in which case the resulting impact modifier composition may be isolated by coagulation or spray drying; or (ii) in dry powder form.

The present invention also provides for the use of the impact modifier composition described above to improve the impact strength and to lower the viscosity of melt processed plastics resins.

Impact modified plastics resins may be prepared by combining one or more plastics resins with the impact modifier composition described above.

A second embodiment of the present invention provides a method of preparing an impact modified plastics resin comprising combining at least one mineral oil with at least one impact modifier and a plastics resin, wherein the at least one mineral oil is not added as, or as part of, an external lubricant for the plastics resin.

Preferably, the amount of impact modifier added to the plastics resin is from 0.1 to 20 parts per hundred parts of resin (PHR).

The invention also provides for the use of the method according to the second embodiment to produce an impact modified plastics resin having a reduced melt viscosity.

The present invention also includes articles that may be made from the impact modified plastics resins described above.

In all of the above embodiments, suitable plastics resins include polyvinyl halide resins, such as polyvinyl chloride; polyalkylene terephthalate polymers; such as polyethylene terephthalate and polybutyleneterephthalate polymers; polycarbonate polymers; polyalkylene terephthalate/polycarbonate polymer blends; acrylonitrile/butadiene/styrene polymers; polyolefin polymers, such as polyethylene, polypropylene; mixed polyolefin polymer blends such as polymer blends of polyethylene and polypropylene polymers; and polyketone polymers. The term "plastics resin" is to be interpreted to include mixtures or blends of one or more of these polymers. The term 'polymer' is to be interpreted to include all types of polymer molecules characterized as having repeating units of atoms or molecules linked to each other such as homopolymers co-polymers including block, random, and alternating co-polymers, grafted polymers, and co-polymers terpolymers, etc.

Also, in all of the above embodiments, it is preferable that the weight ratio (hereafter "ratio") of mineral oil to impact modifier is from 0.1:10 to 4:10. Further preferably, the ratio is 1.5:10. The actual ratio used will depend upon the relative solubility of the mineral oil in the particular plastics resin and the impact modifier. However, when the ratio is too large, for example 5:1, problems of over lubrication are encountered which makes milling difficult.

The mineral oils useful in the invention are preferably paraffinic oils with saturated straight or branched chains or rings containing at least 20 carbon atoms; naphthenic or relatively naphthenic, that is, containing saturated monocyclic (from 4 to 12 carbon atoms) or polycyclic (from 13 to 26 carbon atoms) hydrocarbon oils; microcrystalline wax, paraffin wax and low molecular weight polyolefins such as polyethylene wax, either in liquid, powder or flake form; aromatic oils with a minimum molecular weight of 300; also suitable are mineral oils known as white mineral oils which are a complex mixture of saturated paraffinic and naphthenic hydrocarbons and are free of aromatic compounds, sulphur containing compounds, acids and other impurities. Preferred mineral oils are those which are easy to handle and do not present environmental and/or health concerns, such as those which have a low viscosity and those with a low volatility at the temperatures used during the milling and extrusion blending processes. Particular preferred mineral oils include the heavy mineral oil such as those termed USP mineral oils which typically have a density of from 0.860–0.89 g/m and light mineral oils which typically have a density of from 0.80–0.87 g/m. The preferred heavy mineral has a density of 0.862 g/ml and the preferred light mineral oil has a density of 0.838 g/ml, both of these oils are available from the Aldrich Chemical Company.

Any impact modifier is contemplated for use in the present invention, especially preferred include graft copolymers comprising a rubbery polymeric core and one or more rigid shells. Examples of suitable impact modifiers include methyl methacrylate/butadiene/styrene based resins (MBS), acrylic based impact modifiers (AIMS), acrylonitrile/butadiene/styrene based graft copolymers (ABS), ethylene/vinyl acetate based graft copolymer (EVA), methylmethacrylate/acrylonitrile/butadiene/styrene based copolymers (MABS), butadiene/styrene based copolymers (BS), methacrylate/butadiene based copolymers (MB), methylmethacrylate/acrylate/acrylonitrile based copolymers (MAA), chloropolyethylene based copolymers (CPE); block copolymers based on styrene/butadiene/rubber (SBR) and styrene/ethylene/butene/styrene block copolymers (SEBS), ethylene/propylene/diene monomer (EPDM) and butyl acrylate based polymer modifiers modified with siloxane and/or butadiene monomers in the core. Preferred graft impact modifiers are methyl methacrylate/butadiene/styrene based graft copolymers and acrylic based impact modifiers.

It is contemplated that the at least one mineral oil is mixed with the impact modifier by either (i) combining the mineral oil directly or indirectly with impact modifier after the impact modifier has been formed or (ii) adding mineral oil at the start of, or at some point during, the reaction process used to prepare the impact modifier.

A general description of the preparation of impact modifiers is fully described in the prior art, for example, U.S. Pat. Nos. 2,802,809, 3,678,133, 3,251,904, 3,793,402 2,943,074, 3,671,610, and 3,899,547, which documents are incorporated herein by reference.

In the particular embodiment disclosed in U.S. Pat. No. 3,678,113, a composite interpolymer is disclosed which comprises a multi-phase acrylic base material comprising a first, elastomeric phase polymerized from a monomer mix, comprising at least about 50 weight percent of an alkyl acrylate having about two to eight carbon atoms in the alkyl group and a minor amount of a cross-linking agent, and a second, rigid thermoplastic phase polymerized from a monomer mix comprising at least about 50 weight percent alkyl methacrylate having one to four carbon atoms in the alkyl group, and having a molecular weight of from about 50,000 to 600,000.

The composite interpolymer material is ordinarily and preferably prepared by emulsion polymerization of the elastomer as a discrete phase from a monomer mix of at least about 50 weight percent of an alkyl acrylate and about 0.05 to 5.0, preferably 0.1 to 3.5, weight percent of a cross-linking agent. Upon completion of the polymerization of the elastomeric phase, i.e., substantial exhaustion of the monomers in the initial polymerization mix, the rigid thermoplastic phase is then formed by polymerization in the presence of the elastomer, in the same emulsion, and preferably with minimal penetration or swelling of the elastomer phase, from a monomer mix comprising at least about 50 weight percent $C_1$ to $C_4$ alkyl methacrylate. The polymerization of the rigid thermoplastic phase of the composite is preferably conducted in such a fashion that substantially all of the rigid phase material is formed on or near the surface of the elastomeric phase as hereinafter more fully described, and without the formation of substantial numbers of new particles in the emulsion.

The acrylic elastomer phase of the composite interpolymers of the present invention comprises at least 50 percent of alkyl acrylate units. The alkyl esters of acrylic acid having alkyl groups of two to eight carbon atoms, and preferably four carbon atoms, are contemplated. Longer chain alkyl groups can be used, although substantial difficulties in the polymerization can result, and such monomers are not preferred inclusions.

Other acrylic monomer, including acrylonitrile, methacrylonitrile, alkylthioalkyl acrylates such as ethylthioethyl acrylate, and the like, alkoxyalkyl such as methoxyethyl acrylate, and the like, also can be used in proportions ranging up to about 49.95 weight percent. Interpolymers of these acrylates can further include up to about 20 weight percent of other non-acrylic copolymerizable monomers, such as styrene, alkyl methacrylates, olefins, vinyl ethers, amides and esters, vinyl and vinylidene halides, and the like.

Another inclusion in the acrylic elastomer includes polyfunctional monomers capable of forming a cross-linked elastomer, such as polyethylenically unsaturated monomers like polyacrylates and polymethacrylates, divinyl benzene, and monomers capable of ionic and coordinate cross-linking such as acid groups and organic and inorganic bases and other electron donating groups coordinating with suitable electorophilic agents. The resulting cross-linked elastomers are referred to as gelled polymers to describe that physical characteristic of the polymers. The polyethylenicauly unsaturated monomers include polyacrylic and polymethacrylic esters of polyols, such as 1,3-butylene diacrylate and dimethacrylate, trimethylol propane trimethacrylate and the like, di-and tri-vinyl benzene, vinyl acrylate and methacrylate, and other common cross-linking monomers. These cross-linking monomers can be generally characterized, for purposes of the present invention, as compounds having at least two polymerizable ethylenically unsaturated reactive groups which are non-conjugated or, if conjugated, mediately conjugated. Mediate conjugation results when the reactive groups are conjugated with and/or through an intermediate, non-polymerizable unsaturated group. For example, the two vinyl groups of divinyl benzene are not conjugated with each other except by virtue of the "mediating" effect of the aromatic unsaturation. Likewise, the polymerizable unsaturation of vinyl acrylate is conjugated only through the mediation of the carbonyl unsaturation. The polymerizable groups of butadiene, on the contrary, are directly conjugated, and is accordingly not within the scope of the presently, contemplating cross-linking monomers. Use of directly conjugated materials such as butadiene and the like results in failure to attain the benefits of the present invention.

Preferred elastomers within the scope of the present invention include acrylic interpolymers prepared from monomer mixtures comprising about 50 to 99.95 parts by weight alkyl acrylate monomers, wherein the alkyl group contains one to eight carbon atoms, about 5 to 30 parts by weight other acrylic monomers, about 0 to 20 parts by weight of other non-acrylic ethylenically unsaturated monomers and about 0.05 to 5, preferably 0.1 to 3.5 parts by weight of a polyunsaturated non-conjugated or mediately conjugated cross-linking monomer.

In the preparation of the elastomeric phase, it will ordinarily be preferred to choose monomer systems and proportions so as to effect control the glass transition temperature, (Tg), of the phase. The Tg of the elastomeric phase should be, in most situations, below about 10° C., and preferably below about 0° C. In most preferred formulations, Tg should be below about −30° C.

The rigid thermoplastic phase of the composite interpolymer of the present invention includes the acrylic thermoplastics polymerized from monomer mixtures comprising 40 to 100 weight percent alkyl methacrylate, wherein the, alkyl group has one to four carbon atoms, one or more acrylic comonomers in quantities of 0 to 60 weight percent such as other alkyl and aryl methacrylates, alkyl and aryl acrylamides, substituted alkyl and aryl acrylic and methacrylic monomers, wherein the substitutents can be halogen, alkoxy, alkylthio, cyanoalkyl, amino, alkylthio, and other like substituents, 0 to 60 weight percent non-acrylic unsaturated monomers which impart rigid character to the rigid phase, such as vinyl aromatics, preferably styrene and .alpha.-methylstyrene, vinyl and vinylidene halides, and vinyl-substituted nitriles, and 0 to 10 weight percent of still other nonacrylic unsaturated monomers, including vinyl esters, vinyl ethers, vinyl amides, vinyl ketones, olefins, and the like. To obtain higher service temperatures, cycloalkyl esters of methacrylate acid are useful wherein the cyclic portion contains five, six, or seven carbon atoms, with or without an additional alkyl bridge, the alkyl portion of the cycloalkyl group containing up to 10 carbon atoms, such as isobornyl methacrylate.

The rigid phase is further characterized by molecular weight ranging from about 50,000 to 600,000, preferably 50,000 to 500,000, and still more preferably 50,000 to 300,000. A particularly effective molecular weight for attaining the full benefits of the present invention is about 100,000 to 250,000, which level is also relatively convenient to attain in preparing the composite interpolymers of the present invention. Unless otherwise noted the term "molecular weight" refers to viscosity average molecular weight (Mv).

In the preparation of the rigid thermoplastic phase, it will often be desirable to obtain a glass transition temperature, (Tg), above at least about 20° C., and preferably above about 50° C. In most preferred formulations, Tg of the rigid phase should be above about 90° C.

The composite acrylic interpolymers of the present invention are prepared in suspension or emulsion polymerization procedures utilizing a multi-stage or sequential technique. In simplest form, the elastomeric phase is formed in an initial stage and the rigid thermoplastic phase is formed in a second stage. Either the elastomeric or rigid phases can themselves also be sequentially polymerized. The monomers of the initial stage, together with polymerization initiators, soap or emulsifiers, polymerization modifiers and chain transfer agents and the like are formed into the initial polymerization mix and polymerized, e.g. by heating and mixing the emulsion, in well known and wholly conventional fashion, until the monomers are substantially depleted and a seed polymer is formed. Monomers of the second, and in turn, of each additional stage are then added with appropriate other materials e.g. supplementary initiators, soap, modifiers, and the like, so that the desired polymerization of each stage occurs in sequence to substantial exhaustion of the monomers. In each stage subsequent to the first, the amounts of the initiator and soap, if any, are maintained at a level such the polymerization occurs at or near the surface of the existing particles, and no substantial number of new particles, or seeds, form in the emulsion. When the two phases of the composite interpolymer are either themselves formed by sequential polymerization, the monomer constituents of the various stages of each phase may vary from stage to stage, or all the components can be present throughout the entire phase polymerization. The stages can vary in hardness, from a very soft elastomer first stage seed to the hardest rigid thermoplastic. Both the elastomer and rigid thermoplastic can contain chain transfer agents, in one or all stages, and any or all stages of the composite can contain polyfunctional cross-linking monomers. The molecular weight of the hard phase might be controlled by modification of either the hard phase itself with chain transfer agents or it might be controlled by providing sites on the elastomer particles that act as chain transfer agents in the hard phase. These techniques include any type of chain transfer agents in the elastomeric phase and specifically include pendant mercaptan groups and di-functional monomers such as poly-unsaturated monomers which by the difference in the reactivity between the functional groups cause functional groups such as unsaturation to remain in the elastomer which will act as claim transfer agents in the latter hard phase.

The polymerization reactions can be initiated by either thermal or redox type initiator systems. Examples of thermal initiators include the organic peroxides, such as benzoyl peroxide, substituted benzoyl peroxides, acetyl peroxides, lauroyl peroxide, t-butyl hydroperoxide, di-t-butyl hydroperoxide, peresters, such as t-butyl peroxypivilate, axo-type initiators such as azo-bis-isobutyronitrile, persulfates, such as sodium, potassium or ammonium persulfate, and peroxyphosphates such as sodium, potassium, or ammonium peroxyphosphate. Redox initiators are generally a combination of a hydroperoxide, such as hydrogen peroxide, t-butyl-hydroperoxide, cumene hydroperoxide, diisopropylbenzene hydroperoxide, and the like, with a reducing agent, such as a sodium, potassium, or ammonium bisulfite, metabisulfite, or hydrosulfite, sulfur dioxide, hydrazine, ferrous salts, ascorbic acid, sodium formaldehyde sulfoxylate and the like, as are well known in the art. In the utilization of emulsion polymerization techniques, it is preferred that a oil soluble initiator system be utilized in preference to water soluble initiator systems.

Examples of emulsifiers or soaps suited to polymerization processes of the present invention include alkali metal and ammonium salts of alkyl, aryl, alkaryl, and aralkyl sulfonates, sulfates and polyether sulfates, ethoxylated fatty acids, esters, alcohols, amines, amides, alkyl phenols, complex organophosphoric acids and their alkali metal and ammonium salts.

Chain transfer agents are ordinarily desirable in the polymerization mix for the control of the molecular weight of the rigid thermoplastic phase. The art is well aware of numerous techniques for the control of molecular weight, and there is no criticality in the present invention in any particular technique. A preferred technique, however, is the inclusion of a lower alkyl mercaptan, such as sec-butyl mercaptan, in the polymerization mix during the stage or stages when the rigid phase is polymerized. It has been noted that higher normal alkyl mercaptans, i.e., $C_{10}$ to $C_{12}$ are not effective in reasonable amounts and should ordinarily not be used. In particular, it was noted that n-dodecyl mercaptan was ineffective for attaining the molecular weight range required in the present invention without substantial contamination of the product with residual mercaptan. Other techniques for controlling molecular weight of the rigid phase include the presence of relatively large amounts of peroxide and operations at high temperature, and the presence of allyl compounds.

The composite interpolymer of the present invention is comprised of the two discrete phases. Because of the extreme complexity of the interrelations among the various ingredients, it is difficult to isolate and describe the physical characteristics of the component phases. Because of the degree of cross-linking in the elastomer phase no adequate or meaningful determination of molecular weight can be ascertained for the elastomeric phase. Extraction of the composite interpolymer permits determination of the rigid phase, which will have a measurable molecular weight of from about 50,000 up to as much as 600,000. The elastomer portion has been ascertained to have a swelling ratio (weight of wet, acetone extracted, insoluble gel/weight of dry, acetone extracted gel) ranging from about 2 to 12.

The relative proportions of the elastomeric and harder thermoplastic phases can vary considerably, but will ordinarily be in the range of about 40–90 weight percent elastomer and conversely about 20–60 weight percent thermoplastic, preferably on the order of about 50–80 weight percent elastomer and about 20–50 weight percent rigid thermoplastic.

It is preferred that the polymerization conditions be maintained such that the rigid phase is polymerized at or near the surface of the elastomer phase, and preferably in a discrete layer which encapsulates the elastomer and with minimized penetration and swelling of the elastomer of the rigid phase monomers. The encapsulation is not narrowly important, however, and often entirely satisfactory results are attained when the rigid phase covers only a portion of the surface of the elastomer, but it has been noted that when too large a proportion of the volume of the elastomer is penetrated and swelled by the rigid phase monomers, the impact properties and processing characteristics of the blends of the composite interpolymer with the vinyl halide polymers are detrimentally affected.

By control of the polymerization variables, it is possible to control the particle size of this composite interpolymer, in a fashion well-known to the art. The particle size is not of narrow significance to the present invention; it can range from as low as about 500 angstroms, or even less, up to as large as about 3,000 angstroms or even more. In certain circumstances, however, more narrow particle size ranges can be of significance. For example, it is preferable to utilize particles as large as possible, consistent with the effective and economical preparation of the material. In the manufacture of composites for the preparation of extruded shapes, it is accordingly preferred that the particle diameters range from about 1,500 to 2,500 angstroms, more preferably 1,600 to 2,300 angstroms. See, for example, Column 2, line 10 through Column 5, line 58 of U.S. Pat. No. 3,678,133. A typical process for making an impact modifier involves the steps of: a) mixing together one or more first monomers an initiator and, optionally, an aqueous surfactant solution; b) heating the resulting mixture to polymerise the monomers; optionally c) combining the resulting polymerised product from step b) with one or more second monomers, a further initiator and further surfactant and heating the resulting mixture to produce an impact modified latex; and d) isolating the resultant impact modifier. This process can be an emulsion, a mini-emulsion or a micro-emulsion polymerisation process, a suspension polymerisation process, a dispersion polymerisation process, a precipitation polymerisation process or an inverse emulsion polymerisation process.

The MBS resins of the invention can be obtained, in general, by emulsion-polymerization of butadiene or a monomer mixture of butadiene as the principal constituent and styrene, with addition of a small quantity of a cross-linking agent, to produce a polymer latex, causing a monomer mixture containing styrene and methyl methacrylate and a small quantity of a cross-linking agent as an additive to be adsorbed on the polymer latex and be polymerized thereon, or further adding thereto methyl methacrylate containing a cross-linking agent, and causing polymerization, and subjecting the latex thus obtained to salting out, whereby MBS resin in the form of fine particles can be obtained.

The present invention, therefore, provides a process for combining at least one mineral oil with at least one impact modifier comprising forming the at least one impact modifier using the steps of:- a) mixing together an aqueous surfactant solution, a first monomer material and an initiator; b) heating the resulting mixture to polymerise the monomers; optionally c) combining the resulting polymerised product from step b) with a second monomer, a further initiator and further surfactant and heating the resulting mixture to produce a core/shell latex; and d) isolating the resultant impact modifier; wherein at least one mineral oil to the reaction mixture formed during any one or more of the steps a), b), c) or d).

The above process is also useful to combine impact modifiers with oils which are not mineral oils. These oils include polymers which have a weight average molecular weight (Mw) of 5000 or less comprising polybutene, polydimethylsiloxane, polypropylene, polybutadiene, polyisoprene, preferably the polybutene has a Mw of 300–1500 and the polydimethylsiloxane has a Mw of 900–3100; alkylacrylates having an alkyl group containing 12 or more carbon atoms such as stearyl(meth)acrylate, lauryl(meth)acrylate; esters containing carboxylic acids or alcohols with 12 or more carbon atoms, for example, methyl stearate, ethyl stearate, butyl stearate, stearyl citrate; vegetable oils such as sunflower oil, peanut oil or olive oil; marine oils such as cod liver oil; industrial oils like, castor oil and linseed oil; palm oil such as coconut oil and animal fats such as tallow.

The impact modifier composition of the present invention may also comprise additives such as stabilisers, internal lubricants such as calcium stearate, pigments e.g. $TiO_2$, and processing aids such as PARALOID K-120N™ (available from Rohm and Haas Company).

The present invention will now be described with reference to the following examples.

The mineral oils used in the following experiments were obtained from the Aldrich Chemical Company. Except where otherwise noted, heavy mineral oil was used in these tests. Heavy mineral oil has a density of 0.862 g/ml and light mineral oil has a density of 0.838 g/ml.

The following general methods are useful to incorporate the mineral oil, the impact modifier and the plastics resin together and are in accordance with the present invention.

(A) Milling and Compression Moulding

Impact modifier and mineral oil were mixed together in the desired ratio. After allowing the mineral oil to be absorbed into the impact modifier, the impact modifier-mineral oil mix was blended with the plastics resin by milling for 5 minutes at 177° C. using an electric Collin mill. The roller gap was initially set at 12 mils and then increased to 20 mils after fluxing and the roll speed is set at 26 revs/min for the front roller and 20 revs/min for the rear roller. After milling, the product was removed from the mill and compression moulded in a 16.6 cm×24.4 cm×0.32 cm (6.5"×9.5"×0.125") mould at 177° C. The moulding was carried out using a "Reliable Press" under 10 tons pressure under heating for 3 minutes, for 2 minutes under heating at 70 tons pressure and then for 5 minutes with cooling at 70 tons pressure. Bars were cut from these moulded plaques and tested under the notched Izod impact test conditions (ASTM D-256).

(B) Extrusion and Injection Moulding

The impact modifier and mineral oil were mixed together in the desired ratio and, after allowing the mineral oil to be absorbed into the impact modifier, the resultant mixture was blended with a plastics resin using a Leistritz twin-screw extruder. The melt temperature was 147–152° C. and the melt pressure was 600–710 psig. Notched Izod bars were then injection moulded on a Arburg injection moulding machine using a mould temperature of 90° C., and a feed, centre, metering and nozzle temperature of 145° C., 170° C., 175° C. and 180° C. respectively.

(C) Isolation of the Impact Modifier/Mineral Oil Composition

It is possible to isolate the composition of impact modifier and mineral oil obtained as described in (A) and (B) above, prior to blending with the plastics resin, using, for example, coagulation or spray drying methods.

(a) Coagulation

Mineral oil was emulsified using an air driven homogenizer using 1% (based on the mineral oil) of sodium lauryl sulphate (SLS) in an oil:water weight ratio of 30:70. The emulsified oil was then mixed with the impact modifier latex before batch coagulation using standard methods and the resulting product was dried in a vacuum oven at 60° C. It was found that the presence of the mineral oil did not affect the coagulation temperature.

(b) Spray Drying

An aqueous mixture of the mineral oil was first emulsified with sodium lauryl sulphate (SLS) solution before adding to the impact modifier latex with stirring. The mineral oil emulsion-impact modifier blend was then spray dried with a Niro Minor laboratory Spray dryer. The emulsion solids level was approximately 30%. The material was pumped to the dryer atomizer which was running at approximately 40,000 rpm. Heat settings were 150° C. inlet and 55° C. outlet. The water was flashed off and dry powder was collected.

Examples 1–8 below show how the impact modifier composition of the present invention, produce a melt processed plastics resin with an improved impact strength and a reduced viscosity. Examples 9 and 10 are comparative and do not form part of the present invention. Examples 11 and 12 investigate how the mineral oil is interacting with the plastics resin and impact modifier and Examples 13–15 demonstrate that oils may be incorporated into impact modifiers during the emulsion process for making the impact modifier and that the resulting modified impact modifier product favourably improves impact strength and lowers the viscosity of melt processed resin.

The melt flow rate (MFR) was determined at a temperature of 190° C. and a load of 21.6 Kg (Condition F, ASTM D-1238), unless otherwise noted.

The term "PHR" means per hundred parts of resin and in the following examples the resin is polyvinyl chloride (PVC).

Three different PVC containing formulations were tested as detailed below:

| Typical PVC Capstock Formulation (PVCl) | | |
|---|---|---|
| | PHR | Source |
| PVC, (GEON 27 ™) | 100 | The Geon Company |
| Stabiliser (TM 281SP ™) | 1.2 | Morton International |
| External Lubricant (XL 165 ™) | 1.0 | Hoechst GmbH |
| Ca Stearate | 1.3 | |
| $TiO_2$ | 10 | SCM Chemicals |
| PARALOID K 175 ™ | 0.5 | Rohm and Haas Company |

| Typical PVC Injection Moulding Formulation (PVC$^2$) | | |
|---|---|---|
| | PHR | Source |
| PVC, BFG 110X377 | 100 | B. F. Goodrich Company |
| TM 181, Stabiliser | 2.0 | Morton International |
| Glycerol Monostearate | 2.7 | Lonza Inc. |
| Polyethylene wax (AC629A) | 0.3 | Allied corporation |

Typical PVC Siding Formulation (PVC³)

| | PHR | Source |
|---|---|---|
| PVC K68 | 100 | |
| Dibasic Lead Phosphite (NAFTOVIN T90 ™) | 3 | Chemson |
| Neutral Lead Stearate (LISTAB 28 ™) | 0.3 | Chemson |
| Dibasic Lead Stearate (LISTAB 51 ™) | 0.7 | Chemson |
| Ca Stearate | 0.3 | Chemson |
| Dicarboxylic acid ester (LOXIOL G61 ™) | 0.4 | Henkel GmbH |
| Neutral Ester Wax (LOXIOL G32 ™) | 0.5 | Henkel GmbH |
| High mol. Wt polyethylene Wax (AC307A ™) | 0.05 | Allied Chemical |
| PARALOID K175 ™ | 0.5 | Rohm and Haas Company |
| CaCO₃ | 5 | |
| TiO₂ | 4 | |

EXAMPLE 1

The Effect of Mineral Oil on the Impact Strength and Viscosity of PVC[1]

Following the mixing and moulding method (A) above, mineral oil was mixed in the amounts shown in Table I below with 5 PHR of an acrylic based impact modifier, PARALOID KM 355™ and compression moulded to produce notched Izod bars.

TABLE I

| Mineral Oil, PHR | 0 | 0.25 | 0.375 | 0.5 |
|---|---|---|---|---|
| N. Izod @ 15° C., (Ft-Lb/In) | 24.5 | 25.7 | 26.1 | 25.1 |
| N. Izod @ 10° C., (Ft-Lb/In) | 5.8 | 9.4 | 13.1 | 23.5 |
| MFR (g.10 Min) | 4.9 | 5.1 | 5.6 | 6.9 |

The results in Table I show that as the amount of mineral oil in the PVC resin blend increases, impact strength also increases and the viscosity markedly decreases.

EXAMPLE 2

The Effect of Higher Levels of Mineral Oil on the Impact Strength of PVC[1]

Mineral oil was mixed in the amounts shown in Table II below with either PARALOID KM355™ or EXL 2600™ (an MBS based impact modifier available from Rohm and Haas Company and, after allowing the mineral oil to be absorbed into the impact modifier, the resulting composition was added to PVC[1] and notched Izod bars produced as detailed in method (A) above.

TABLE II

| Mineral Oil PHR | 0 | 0.5 | 0.75 | 1.5 | 5 | 10 |
|---|---|---|---|---|---|---|
| 5 PHR PARALOID KM 355 ™ N. Izod @ 15° C. (Ft-Lb/In) | 15.9 | 22.8 | 23.7 | 22.0 | 0.4 | 0.2 |
| 5 PHR EXL 2600 ™ N. Izod @ 15° C. (Ft-Lb/In) | 6.3 | 16.9 | 17.3 | 14.0 | 2.4 | 0.3 |

The results in Table II indicate that when the level of mineral oil is too high, in this case 5PHR or more, the benefits of increased impact strength and reduced viscosity are lost.

EXAMPLE 3

The Effect of Different Grades of Mineral Oil on the Impact Strength Of PVC[1] Resin Notched Izod bars (⅛") were prepared according to method (A) above, the impact modifier used was PARALOID KM 355™ in an amount of 5 PHR.

TABLE III

| Mineral Oil PHR | 0 | 1.0, Heavy Oil | 1.0, Light Oil |
|---|---|---|---|
| N. Izod @ 17° C. (Ft-Lb/In) | 4.1 | 23.5 | 19.7 |
| N. Izod @ 15° C. (Ft-Lb/In) | 4.3 | 18 | 13.1 |
| N. Izod @ 10° C. (Ft-Lb/In) | 3.5 | 7.4 | 4.4 |

As the results in Table III show, both heavy and light oil increase the impact strength of PVC when blended with an impact modifier.

EXAMPLE 4

The Effect of Mineral Oil on the Impact Strength and Viscosity of PVC[2] when Used with a Butadiene Based Impact Modifier Following method (B) described above, notched Izod bars (¼") were produced from a mixture of mineral oil, in the amounts shown in Table IV below, and 13 PHR of butadiene based impact modifier, BTA 751 available from Rohm and Haas Company

TABLE IV

| Mineral Oil PHR | 0 | 1.3 |
|---|---|---|
| N. Izod @ 15° C. (Ft-Lb/In) | 7.9 | 9.1 |
| N. Izod @ 10° C. (Ft-Lb/In) | 3.3 | 9.2 |
| N. Izod @ 5° C. (Ft-Lb/In) | 2.1 | 5.9 |
| N. Izod @ 0° C. (Ft-Lb/In) | 2.0 | 3.3 |
| MFR, g/10 Min (190° C./7.4 Kg) | 10.8 | 13.1 |

Thus, the addition of mineral oil also improves the impact strength of butadiene based impact modifiers and lowers the viscosity of PVC resin.

EXAMPLE 5

The Effect of Mineral Oil on the Impact Strength and Viscosity of PVC[2] when Used with a PARALOID KM 365™ Impact Modifier Following method (B) described above, notched Izod bars were produced from a mixture of mineral oil in the amounts shown in Table V below, and 13 PHR of PARALOID KM 365™ acrylic impact modifier (product of Rohm and Haas Company).

TABLE V

| Mineral Oil PHR | 0 | 1.3 |
|---|---|---|
| N. Izod @ 23° C. (Ft-Lb/In) | 12.3[a] | 12.9[a] |
| N. Izod @ 15° C. (Ft-Lb/In) | 2.6[a] | 11.3[a] |
|  | 14.0[b] | 16.8[b] |
| N. Izod @ 10° C. (Ft-Lb/In) | 2.0[a] | 2.6[a] |
|  | 1.4[b] | 16.0[b] |
| N. Izod @ 5° C. (Ft-Lb/In) | 2.4[b] | 12.9[b] |
| MFR, g/10 Min 190° C. @ 7.4 Kg | 10.8[b] | 11.2[b] |

[a] ¼" notched Izod bars
[b] ⅛" notched Izod bars

The results in Table V show that mineral oil mixed with another acrylic impact modifier will also provide increased impact strength and flow rate as compared against samples which comprise only impact modifier and no mineral oil.

EXAMPLE 6
The Effect of Adding to PVC[1] a Prior Isolated Composition Comprising Mineral Oil and PARALOID KM 355™

Emulsified mineral oil was added to PARALOID KM 355™ latex impact modifier and the resulting mineral oil-impact modifier blend was then isolated is by coagulation according to the method described in (C)(a) above. This isolated product was then blended with PVC[1] using the milling and compression moulding method (A) above, and notched Izod bars were formed and tested (ASTM D-256). Imp act strength tests were conducted to compare the effect of i) 0 PHR mineral oil and 5 PHR PARALOID KM $_{355}$™, ii) 0.5 PHR mineral oil and 5 PHR PARALOID KM 355™ and iii) 1.25 PHR mineral oil and 5 PHR PARALOID KM 355™ on the impact strength of PVC[1].

TABLE VI

| Mineral Oil PHR | 0 | 0.5 | 1.25 |
|---|---|---|---|
| N. Izod @ 15° C. (Ft-Lb/In) | 20.4 | — | 23.0 |
| N. Izod @ 12° C. (Ft-Lb/In) | 4.5 | — | 9.7 |
| N. Izod @ 10° C. (Ft-Lb/In) | 4.3 | — | 12.9 |
| MFR, (g/10 Min, 190° C. @ 21.6 Kg) | 4.3 | 6.0 | 8.7 |

The results in Table VI show that acrylic impact modifiers coagulated in the presence of emulsified mineral oil provide increased impact strength and melt flow as compared with similar samples which contain an acrylic impact modifier without mineral oil.

EXAMPLE 7
The Effect of Adding To PVC[1] a Prior Isolated Composition Comprising Mineral Oil and EXL 2600™

Emulsified mineral oil was added to EXL 2600™ latex impact modifier and the resulting mineral oil-impact modifier blend was then isolated by coagulation according to the method described in (C)(a) above. This isolated composition was then blended with PVC[1] using the milling and compression moulding method (A) above, and notched Izod bars were formed and tested (ASTM D-256). Impact strength tests were conducted to compare the effect of i) 0 PHR mineral oil and 5 PHR EXL 2600™, ii) 0.5 PHR mineral oil and 5 PHR EXL 2600™ and iii) 0.75 PHR mineral oil and 5 PHR EXL 2600™ on the impact strength of PVC[1].

TABLE VII

| Mineral Oil PHR | 0 | 0.5 | 0.75 |
|---|---|---|---|
| N. Izod @ 15° C. (Ft-Lb/In) | 13.2 | — | 22.2 |
| N. Izod @ 12° C. (Ft-Lb/In) | 4.1 | — | 18.0 |
| N. Izod @ 10° C. (Ft-Lb/In) | 4.1 | — | 7.6 |
| MFR (g/10 Min 190° C. @ 21.6 Kg) | 3.3 | 4.3 | 4.4 |

The results in Table VII show that EXL 2600™, an MBS impact modifier, when spray dried with emulsified mineral oil, produces an increase in impact strength and a reduction in melt flow rate as compared with similar samples which only contain EXL 2600™ and no mineral oil.

EXAMPLE 8
The Effect of Mineral Oil and Chloropolyethylene (CPE) on the Impact Strength of PVC[1]

Mineral oil, in the amounts detailed in Table VIII below, was mixed with chloropolyethylene (CPE) impact modifier (5PHR in PVC[1]), blended with PVC and Izod bars produced using the compression moulding method (B) described above.

TABLE VIII

| Mineral Oil | 0 | 0.25 | 0.375 |
|---|---|---|---|
| N. Izod @ 15° C., (Ft-Lb/In) | 3.8 | 8.6 | 10.6 |
| MFR (g/10 Min 190° C. @ 21.6 Kg) | 7.3 | 6.5 | 9.1 |

The results in Table VIII show that CPE impact modifier has an increased impact strength when combined with mineral oil than when used alone. It is also observed that the viscosity of the melt processed plastics resin reduces when mineral oil is used in an amount equal to or greater than 0.375 PHR.

Comparative Example 9
The Effect of Alpha hydroxyisobutyric acid (HIA) (lubricant) on the Impact Strength of PVC[1]

Various amounts of HIA as detailed in the table below were mixed with either PARALOID KM 355™ (5 PHR) or EXL 2600™ (5PHR) blended with PVC and notched Izod bars were then produced using method (B) above.

TABLE IX

| HIA PHR | 0 | 0.5 | 1.0 |
|---|---|---|---|
| 5 PHR PARALOID KM 355 ™ N Izod @ 18° C., (Ft-Lb/In) | 21 | 3.7 | 3.8 |
| 5 PHR EXL 2600 ™ N Izod @ 18° C., (Ft-Lb/In) | 11.2 | 3.6 | 3.4 |

These results show that HIA causes a detrimental reduction in the impact strength when mixed with either MBS or acrylic impact modifiers.

Comparative Example 10
The Effect of Mineral Oil in the Absence of an Impact Modifier Izod bars comprising mineral oil and $PVC^1$ resin were prepared by milling and compression moulding as per method (B) and results are shown in Table X below.

TABLE X

| Mineral Oil PHR | 0 | 0.5 | 1.0 | 1.5 |
|---|---|---|---|---|
| N. Izod @ 17° C. Ft-Lb.In | — | 2 | 2.4 | 2.4 |
| N. Izod @ 15° C. Ft-Lb.In | 1.6 | 2 | 2.2 | 2 |
| N. Izod @ 10° C. Ft-Lb.In | 1.3 | 1.6 | 1.9 | 2 |

As the results show, there is little or no improvement in the impact strength of PVC when mineral oil is blended on its own without an impact modifier.

EXAMPLE 11
The Effect of Mineral Oil and Impact Modifier on the Fusion Time of PVC The fusion time of the melt processed plastics resin was determined using a Haake Rheocord 90 instrument, in particular, the torque versus time profile was obtained.

A plastics resin master batch was prepared ($PVC^4$), by combining 100 parts of PVC plastics resin (Geon EP-103, F76, K67, available from The Geon Company), 1.2 parts of a commercial stabiliser sold by Morton International under the trade name TM 181™, 1.3 parts of calcium stearate and 1.0 part of an external lubricant sold by Hoescht GmbH under the trade name Hostalube 165™, and then adding mineral oil and/or impact modifier to 60 g of this master batch in the amounts shown in Table XI below. The resulting master batch was then introduced into the Haake bowl. The run temperature was 185° C. and the rotor speed was 60 rpm. The mineral oil was either added directly to the PVC master batch or premixed with the impact modifier and then added to the PVC. The fusion time (seconds) is the time taken to reach the peak of the torque versus time profile following the initial Haake premixing.

TABLE XI

| Composition | Mineral Oil (PHR) | Fusion Time (Sec) |
|---|---|---|
| $PVC^4$ (control-no mineral oil or impact modifier) | 0 | 262 |
| $PVC^4$ | 0.25 | 373 |
| $PVC^4$ | 0.5 | 544 |
| $PVC^4$ | 0.75 | 538 |
| $PVC^4$ | 1 | 504 |
| $PVC^4$ + 5 PHR PARALOID KM 355 ™ | 0 | 112 |
| $PVC^4$ + 5 PHR PARALOID KM 355 ™ | 0.25 | 119 |
| $PVC^4$ + 5 PHR PARALOID KM 355 ™ | 0.5 | 119 |
| $PVC^4$ + 5 PHR PARALOID KM 355 ™ | 0.75 | 114 |
| $PVC^4$ + 5 PHR PARALOID KM 355 ™ | 1.0 | 119 |

*Impact modifier and mineral oil blended together first before adding to PVC master batch.

The above results show that i) when impact modifier is absent, increasing amounts of mineral oil causes the time it takes for PVC to fuse to also increase; and ii) when impact modifier and mineral oil are both present, the fusion time is much less affected by increasing amounts of mineral oil. This experiment demonstrates the mineral oil is not acting as an external lubricant when the impact modifier is also present.

EXAMPLE 12
Demonstration that the Mineral Oil Has Little or No Effect on the Softening Point of PVC Vicat tests were performed in accordance with ASTM D-1525 (heating rate of 120° C./Hr) $PVC^1$ composition was used throughout.

TABLE XII

| Composition | Vicat Temp (° C.) (2 Repeats) |
|---|---|
| $PVR^1$ with 5 PHR of PARALOID KM 355 ™ | 89.2, 89.1 |
| $PVC^1$ with 5 PHR of PARALOID KM 355 ™ + 0.5 PHR mineral oil | 88.6, 89.0 |
| $PVC^1$ with 5 PHR of PARALOID KM 355 ™ + 0.75 PHR mineral oil | 88.7, 89.0 |
| $PVC^1$ with 5 PHR of PARALOID KM 355 ™ + 1.0 PHR mineral oil | 88.7, 89.1 |

EXAMPLE 13
Incorporating Mineral Oil into an Impact Modifier During the Emulsion Preparation of the Emulsion Impact Modifier Heavy mineral oil (158.2 g) from Aldrich was dissolved in butyl acrylate monomer (1369 g), and the resulting solution was mixed with water (552.2 g) and, sodium lauryl sulphate (a surfactant), (1.27 g) to form an emulsion. This mixture was then homogenized to form small droplets, fed into a reactor vessel together with an initiator. The resulting mixture was then heated to effect polymerisation. The polymerised product (first stage polymer) was then reacted with methyl methacrylate monomer in an aqueous surfactant solution and an initiator to form a core/shell polymer and this was subjected to batch coagulation with salt. The modified impact modifier product (Sample A) isolated as a fine powder by filtration.

The modified impact modifier (Sample A) was then mixed with $PVC^3$ plastics resin and V-Notched Charpy tests were conducted in accordance with ASTM D-256 (Method B). The test pieces were made by the milling and moulding method (A) above. The impact strength of samples of $PVC^3$ modified with PARALOID KM 355™ were compared with the impact strength of $PVC^3$ containing an equivalent amount of modified impact modifier, Sample A.

TABLE XIII

| Test Composition | |
|---|---|
| | V-Notched Charpy Impact Strength $KJ/M^2$ @ 23° C. |
| $PVC^3$ + 7 PHR PARALOID KM 355 ™ | 34.5 |
| $PVC^3$ + 7 PHR Sample A | 54.2 |
| | MFR g/10 Min 190° C. @ 21.6 Kg |
| $PVC^1$ + 5 PHR PARALOID KM 355 ™ | 2.0 |
| $PVC^1$ + 5.5** PHR of Sample A | 5.3 |

**This is equivalent to 5 PHR PARALOID KM 355 ™ and 0.5 PHR of mineral oil.

EXAMPLE 14

Incorporating Polydimethylsiloxane into an Impact Modifier During the Emulsion Preparation of the Impact Modifier The polydimethylsiloxane used in this experiment had a molecular weight of 900 g/mole and a viscosity of 10 centistokes.

Polydimethylsiloxane (158.2 g) was dissolved in butyl acrylate monomer (1369 g), and the resulting solution was emulsified with water (552.2 g) and a surfactant, sodium lauryl sulphate, (1.27 g). This emulsion was then homogenized to form small droplets, fed into a reactor vessel together with an initiator. The resulting mixture was then heated to effect polymerisation. The polymerised product (first stage polymer) was then reacted with methyl methacrylate monomer and an initiator to form a core/shell polymer and this was subjected to batch coagulation with salt. The modified impact modifier product (Sample B) isolated as a fine powder by filtration.

The modified impact modifier (Sample B) was then mixed with $PVC^3$ plastics resin and notched Izod tests were conducted in accordance with ASTM D-256, (Method B). The test pieces were made by the milling and moulding method A above, except that milling was carried out at 175° C. and the material was moulded at 190° C. The impact strength of samples of $PVC^3$ modified with PARALOID KM 355™ were compared with the impact strength of $PVC^3$ containing an equivalent amount of modified impact modifier, Sample B.

TABLE XIV

| Test Composition | Notched Izod Impact Strength (Ft Lb/In) | | |
|---|---|---|---|
| | @ 9° C. | @ 11° C. | @ 13° C. |
| $PVC^3$ + 7 PHR PARALOID KM 355 ™ | 10.4 | 12.4 | 17.5 |
| $PVC^3$ + 7 PHR Sample B | 15.2 | 25.9 | 24.3 |

EXAMPLE 15

Incorporating Polybutene into an Impact Modifier During the Emulsion Preparation of the Impact Modifier Polybutene (L-14, Amoco) (30.2 g) was mixed with butyl acrylate monomer (120.9 g), water (63.08 g), allyl methacrylate (0.68 g), Siponate DS-4 (159 g) and a surfactant, sodium lauryl sulphate, (1.27 g) and emulsified. This emulsion was then homogenised in a high speed mixer and the resulting mixture was fed into a reactor vessel. To this was added an initiator and the mixture was heated to effect polymerisation. This polymerised product (first stage polymer) was reacted with methyl methacrylate monomer in an aqueous surfactant solution and an initiator to form a core/shell polymer which was subjected to freeze coagulation to isolate the modified impact modifier product (Sample C).

The modified impact modifier (Sample C) was then mixed with $PVC^1$ plastics resin and notched Izod tests were conducted in accordance with ASTM D-256 (Method B). The test pieces were made by the milling and moulding method A above. The impact strength of samples of $PVC^1$ modified with PARALOID KM 355™ were compared with the impact strength of $PVC^1$ containing an equivalent amount of modified impact modifier, Sample C.

TABLE XV

| Test Composition | Notched Izod Impact Strength (Ft Lb/In) | | |
|---|---|---|---|
| | @ 15° C. | @ 10° C. | @ 7° C. |
| $PVC^1$ + 5 PHR PARALOID KM 355 ™ | 25 | 5 | 4.2 |
| $PVC^1$ + 5 PHR Sample C | 28.8 | 23.8 | 11.9 |

What is claimed is:

1. Impact modifier composition comprising
   a) at least one impact modifier selected from the group consisting of:
      (i) acrylic interpolymers comprising an elastomeric phase and a rigid phase, wherein the elastomeric phase of the acrylic interpolymer consists essentially of 50 to 99.95% by weight units of alkyl acrylate, based on the weight of the elastomeric phase of the acrylic interpolymer; 0.05 to 5.0% by weight units of polyfunctional monomer capable of forming a cross-linked elastomer, based on the weight of the elastomeric phase of the acrylic interpolymer; and, optionally, units of one or more monomers selected from the group consisting of (meth)acrylonitrile, alkylthioalkyl acrylates, alkoxyalkyl acrylates, alkyl methacrylates, vinyl ethers, vinyl amides, vinyl esters, vinyl halides, and vinylidene halides;
      (ii) chloropolyethylene impact modifiers; and
      (iii) methylmethacrylate/acrylate/acrylonitrile impact modifiers;
   b) at least one mineral oil; and
   c) 0–50% by weight of one or more plastics resins.

2. Impact modifier composition according to claim 1 wherein the ratio of mineral oil to impact modifier is in the range from 0.1:10 to 4:10.

3. Impact modifier composition according to claim 1 wherein the at least one impact modifier comprises one or more of the acrylic interpolymer comprising an elastomeric phase and a rigid phase.

4. Impact modifier composition according to claim 1 wherein the at least one mineral oil is selected from at least one of heavy mineral oil and light mineral oil.

5. Method of producing an impact modifier composition according to claim 1, comprising mixing together:
   a) at least one impact modifier selected from the group consisting of:
      (i) acrylic interpolymers comprising an elastomeric phase and a rigid phase, wherein the elastomeric phase of the acrylic interpolymer consists essentially of 50 to 99.95% by weight units of alkyl acrylate, based on the weight of the elastomeric phase of the acrylic interpolymer; 0.05 to 5.0% by weight units of polyfunctional monomer capable of forming a cross-linked elastomer, based on the weight of the elastomeric phase of the acrylic interpolymer; and, optionally, units of one or more monomers selected from the group consisting of (meth)acrylonitrile, alkylthioalkyl acrylates, alkoxyalkyl acrylates, alkyl methacrylates, vinyl ethers, vinyl amides, vinyl esters vinyl halides, and vinylidene halides;
      (ii) chloropolyethylene impact modifiers; and
      (iii) methylmethacrylate/acrylate/acrylonitrile impact modifiers;

b) at least one mineral oil; and c) 0–50% by weight of one or more plastics resins;
wherein the ratio of mineral oil to impact modifier is in the range from 0.1:10 to 4:10.

6. Method according to claim 5 wherein the at least one impact modifier is used either in latex, emulsion or dry powder form.

7. Method of preparing an impact modified plastics resin comprising combining one or more first plastics resins with an impact modifier composition according to claim 1 comprising a) at least one impact modifier selected from the group consisting of:
   (i) acrylic interpolymers comprising an elastomeric phase and a rigid phase, wherein the elastomeric phase of the acrylic interpolymer consists essentially of 50 to 99.95% by weight units of alkyl acrylate, based on the weight of the elastomeric phase of the acrylic interpolymer; 0.05 to 5.0% by weight units of polyfunctional monomer capable of forming a cross-linked elastomer, based on the weight of the elastomeric phase of the acrylic interpolymer; and optionally, units of one or more monomers selected from the group consisting of (meth)acrylonitrile, alkylthioalkyl acrylates, alkoxyalkyl acrylates, alkyl methacrylates, vinyl ethers, vinyl amides, vinyl esters, vinyl halides, and vinylidene halides;
   (ii) chloropolyethylene impact modifiers; and
   (iii) methylmethacrylate/acrylate/acrylonitrile impact modifiers;

b) at least one mineral oil; and c) 0–50% by weight of one or more second plastics resins.

8. Method according to claim 7 wherein the one or more first plastics resins and the one or more second plastics resins are each independently selected from one or more of: polyvinyl halide; polyalkylene terephthalate polymers; polycarbonate polymers; polyalkylene terephthalate/polycarbonate polymer blends; polyolefin polymers; mixed polyolefin polymer blends; and polyketone polymers.

9. Impact modifier composition according to claim 1, comprising up to 50% by weight of one or more plastics resins selected from the group consisting of polyvinyl halides, polyalkylene terephthalate polymers, polycarbonate polymers, polyalkylene terephthalate/polycarbonate polymer blends, polyolefin polymers, mixed polyolefin polymer blends, and polyketone polymers.

10. Method according to claim 5, wherein the ingredient c) comprises up to 50% by weight of one or more plastics resins selected from the group consisting of polyvinyl halides, polyalkylene terephthalate polymers, polycarbonate polymers, polyalkylene terephthalate/polycarbonate blends, polyolefin polymers, mixed polyolefin polymer blends, and polyketone polymers.

11. Method according to claim 10 wherein the at least one impact modifier is used either in latex, emulsion, or dry powder form.

12. Impact modifier composition according to claim 1 further comprising at least one processing aid.

13. Impact modified plastics resin according to claim 7 wherein the amount of the at least one impact modifier is from 0.1 to 20 parts per hundred parts of the plastics resins.

14. Impact modifier composition comprising a) at least one impact modifier consisting essentially of at least one methyl methacrylate/butadiene/styrene impact modifier and, optionally, at least one impact modifier selected from the group consisting of:
   (i) acrylic interpolymers comprising an elastomeric phase and a rigid phase, wherein the elastomeric phase of the acrylic interpolymer consists essentially of 50 to 99.95% by weight units of alkyl acrylate, based on the weight of the elastomeric phase of the acrylic interpolymer; 0.05 to 5.0% by weight units of polyfunctional monomer capable of forming a cross-linked elastomer, based on the weight of the elastomeric phase of the acrylic interpolymer; and, optionally, units of one or more monomers selected from the group consisting of (meth)acrylonitrile, alkylthioalkyl acrylates, alkoxyalkyl acrylates, alkyl methacrylates, vinyl ethers, vinyl amides, vinyl esters, vinyl halides, and vinylidene halides;
   (ii) chloropolyethylene impact modifiers; and
   (iii) methylmethacrylate/acrylate/acrylonitrile impact modifiers;

b) at least one mineral oil; and c) 0–50% by weight of one or more plastics resins.

15. Impact modifier composition according to claim 14 wherein the ratio of mineral oil to impact modifier is in the range from 0.1:10 to 4:10.

16. Impact modifier composition according to claim 14 wherein the at least one mineral oil is selected from at least one of heavy mineral oil and light mineral oil.

17. Impact modifier composition according to claim 14 further comprising at least one processing aid.

18. Method of producing an impact modifier composition comprising mixing together:

a) at least one impact modifier consisting essentially of at least one methyl methacrylate/butadiene/styrene impact modifier and, optionally, at least one impact modifier selected from the group consisting of:
   (i) acrylic interpolymers comprising an elastomeric phase and a rigid phase, wherein the elastomeric phase of the acrylic interpolymer consists essentially of 50 to 99.95% by weight units of alkyl acrylate, based on the weight of the elastomeric phase of the acrylic interpolymer; 0.05 to 5.0% by weight units of polyfunctional monomer capable of forming a cross-linked elastomer, based on the weight of the elastomeric phase of the acrylic interpolymer; and, optionally, units of one or more monomers selected from the group consisting of (meth)acrylonitrile, alkylthioalkyl acrylates, alkoxyalkyl acrylates, alkyl methacrylates, vinyl ethers, vinyl amides, vinyl esters, vinyl halides, and vinylidene halides;
   (ii) chloropolyethylene impact modifiers; and
   (iii) methylmethacrylate/acrylate/acrylonitrile impact modifiers;

b) at least one mineral oil; and c) 0–50% by weight of one or more plastics resins;
wherein the ratio of mineral oil to impact modifier is in the range from 0.1:10 to 4:10.

19. Method of preparing an impact modified plastics resin, comprising combining one or more fist plastics resins with an impact modifier composition comprising a) at least one impact modifier consisting essentially of at least one methyl methacrylate/butadiene/styrene impact modifier and, optionally, at least one impact modifier selected from the group consisting of:
   (i) acrylic interpolymers comprising an elastomeric phase and a rigid phase, wherein the elastomeric phase of the acrylic interpolymer consists essentially of 50 to 99.95% by weight units of alkyl acrylate, based on the weight of the elastomeric phase of the acrylic interpolymer; 0.05 to 5.0% by weight units of polyfunctional monomer capable of forming a cross-linked elastomer, based on the weight of the elastomeric phase of the acrylic interpolymer; and, optionally, units of one or more monomers selected from the group consisting of (meth)acrylonitrile, alkylthioalkyl acrylates, alkoxyalkyl acrylates, alkyl methacrylates, vinyl ethers, vinyl amides, vinyl esters, vinyl halides, and vinylidene halides;

(ii) chloropolyethylene impact modifiers; and (iii) methylmethacrylate/acrylate/acrylonitrile impact modifiers;

b) at least one mineral oil; and c) 0–50% by weight of one or more second plastics resins.

20. Method according to claim 19 wherein the one or more first plastics resins and the one or more second plastics resins are each independently selected from the group consisting of polyvinyl halides, polyalkylene terephthalate polymers, polycarbonate polymers, polyalkylene terephthalate/polycarbonate polymer blends, polyolefin polymers, mixed polyolefin polymer blends, and polyketone polymers.

21. Method according to claim 19 wherein the impact modifier composition further comprises at least one processing aid.

* * * * *